(12) United States Patent  
Redmond et al.

(10) Patent No.: US 8,582,732 B2  
(45) Date of Patent: Nov. 12, 2013

(54) AUTOMATIC DIGIT MAP GENERATION FOR ACCESS GATEWAY DURING CALL SETUP

(75) Inventors: Stefan Paul Redmond, Pointe-Clare (CA); Herbie Francis, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 47 days.

(21) Appl. No.: 13/203,053

(22) PCT Filed: Feb. 25, 2009

(86) PCT No.: PCT/EP2009/052226  
§ 371 (c)(1),  
(2), (4) Date: Oct. 13, 2011

(87) PCT Pub. No.: WO2010/097112  
PCT Pub. Date: Sep. 2, 2010

(65) Prior Publication Data  
US 2012/0106718 A1    May 3, 2012

(51) Int. Cl.  
*H04M 11/00* (2006.01)

(52) U.S. Cl.  
USPC ............. 379/93.01; 379/93.26; 379/230; 379/229

(58) Field of Classification Search  
USPC ............. 379/93.01, 93.26, 230, 229  
See application file for complete search history.

(56) References Cited

U.S. PATENT DOCUMENTS 6,188,760 B1    2/2001  Oran et al.  
6,771,641 B1 *  8/2004  Sollee et al. ............... 370/356

FOREIGN PATENT DOCUMENTS

WO    02/41574 A2      5/2002  
WO    2007/121561 A1  11/2007

* cited by examiner

*Primary Examiner* — Stella Woo  
(74) *Attorney, Agent, or Firm* — Coats & Bennett, P.L.L.C.

(57) ABSTRACT

The invention relates to a method for generating a digit map for a call setup, wherein leading digits of a call number are collected by a gateway and transmitted to a call control server where a call-specific digit map is generated by comparing the leading digits to a numbering plan.

8 Claims, 3 Drawing Sheets

AUTOMATIC DIGIT MAP GENERATION FOR ACCESS GATEWAY DURING CALL SETUP

TECHNICAL FIELD

This invention relates to a method for a call control server of a fixed telecommunications network for generating a digit map for a call setup and relates to the call control server generating the digit map.

BACKGROUND

In modern IP-based voice networks DTMF (Dual Tone Multi-Frequency) B-number dialing is still required in order to support legacy POTS (Plain Ordinary Telephone Service) subscribers. H.248 signaling is used to convey the dialed DTMF digits from access gateways to call control servers, where the number analysis and call routing is performed. Since the H.248 signaling used to convey individual dialed DTMF digits can constitute a significant proportion of the total H.248 signaling volume, digit maps are employed to collect a predefined string of dialed DTMF digits in the access gateway and to transmit the digit string as a single H.248 message towards the call control server. The main purpose of the digit map is to minimize H.248 signaling load for outgoing call attempts by analogue subscribers connected via access gateways. Digit maps allow the network to potentially support more successful outgoing call attempts.

For the reduction in H.248 signaling load to be significant, it must be possible to apply the digit maps in an efficient manner, meaning that as many digits as possible are collected via digit maps and sent to the call control server in H.248 digit strings.

In reality, utilizing digit maps in an efficient manner can be hard to achieve, since a single call control server may serve many hundreds of access gateways, each of which may serve thousands of individual subscribers. Per subscriber, different dialing plans may be applicable, meaning that many different digit maps may need to be defined and allocated accordingly. This implies a fairly significant administrative overhead in manually defining, provisioning and maintaining multiple digit maps effectively.

SUMMARY

Accordingly, a need exists to minimize the signaling load for outgoing call attempts while keeping the administrative workload low.

This need is met by the features of the independent claims. In the dependent claims preferred embodiments of the invention are described.

According to a first aspect of the invention a method for a call control server of a fixed telecommunications network for generating a digit map for a call setup is provided, wherein the method comprises the steps of initiating a digit collection at a gateway in which a predetermined number of leading digits of a call number dialed for said call is collected in a first digit string. This digit string is then received by the call control server containing said predetermined number of leading digits. The call control server then compares the received leading digits contained in said first digit string to a numbering plan and generates a call-specific digit map for said call based on the assumption. In an additional step said call-specific digit map is then transmitted to the gateway.

By generating a call-specific digit map based on the leading digits contained in the digit map optimized digit maps can be automatically generated and applied. This helps to reduce the administrative overhead in defining and provisioning digit maps and helps to keep the traffic load low, as the call control server can determine, based on the leading digits, how many digits will probably follow, the media gateway being able to collect said number of digits and to transmit these remaining digits in a single message.

According to a preferred embodiment of the invention the call-specific digit map is generated by determining a remaining number of digits contained in the call number for said call setup. According to this aspect of the invention a digit map is generated using the remaining B-number length determined by a B-number analysis when digits received in the first digit string are analyzed. The leading digits may be the leading digits of the called number. However, it is also possible that the leading digits may be leading with respect to a subportion of the called number. The digit map may be provided for portions of the dialing process, e.g. for an international or national prefix or operator prefix or for portions of a local number.

Preferably, the digit collection by the gateway is initiated when a subscriber making said call has gone off hook. The fact that the subscriber has gone off hook has been signaled from the gateway to the call control server before, wherein the call control server initiates the digit collection for the first digit string at the gateway when the fact that the subscriber has gone off hook has been detected by the call control server.

The remaining number of digits may be determined by determining a call number length based on said predetermined number of leading digits and by subtracting the predetermined number of leading digits from the call number length. As the number of leading digits contained in the first digit string is known when the call number length has been determined, the remaining number of digits to be collected by the gateway can be determined easily. The remaining number of digits can then be transmitted to the call control server in a single message.

The received leading digits can be compared to a network numbering plan containing region- and/or subscriber-specific call numbers. The network numbering plan provides an information how many digits a number for a certain geographical region has. In the case of subscriber-specific call numbers the numbering plan may comprise information subscriber-specific call numbers. When the received leading digits are compared to the region- or subscriber-specific call numbers, the overall call number length can be determined.

The call-specific digit map may be generated when it is determined that the dialing is incomplete after the predetermined number of leading digits and when at least a minimum possible length of a call number can be determined. If, however, it is determined that the dialing is incomplete, and when a call number length cannot be determined, a digit-by-digit collection is initiated at the gateway in which the gateway transmits each received digit in a separate message. However, this is an exceptional case as at least the minimum possible length can be determined in most of the cases.

The number of digits being collected in the first digit string is selected in such a way that sufficient leading digits of the call number are collected for the call control server to determine the total number length. Preferably, the number of digits being collected can be selected from a group consisting of two, three or four digits. Accordingly, two to four leading digits of the call number are collected in the first digit string.

The invention furthermore relates to a call control server generating the digit map for the call setup, the call control server comprising a digit collecting initiating unit initiating a digit collection at the gateway in which a predetermined number of leading digits of a call number dialed for said call is collected in a first digit string. The call control server furthermore comprises a receiver receiving said first digit string after it has been collected by the gateway. The call control server furthermore comprises a database containing a numbering plan, where region-specific call numbers and/or subscriber-specific call numbers are stored. A call-specific digit map generating unit compares the received leading digits contained in the first digit string to the numbering plan and generates a call-specific digit map for said call based on the comparison. A transmitter is provided transmitting said call-specific digit map to the gateway which then collects the digits using the knowledge of the received digit map.

BRIEF DESCRIPTION OF THE DRAWINGS

The invention will be explained in further detail with reference to the accompanying drawings, in which.

DETAILED DESCRIPTION

Figure 1:
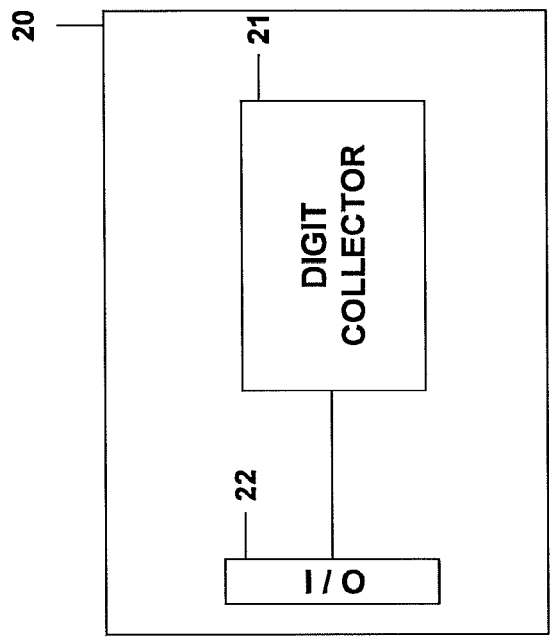
FIG. 1 shows a schematic view of a system allowing the generation of a call-specific digit map.
Figure 1:
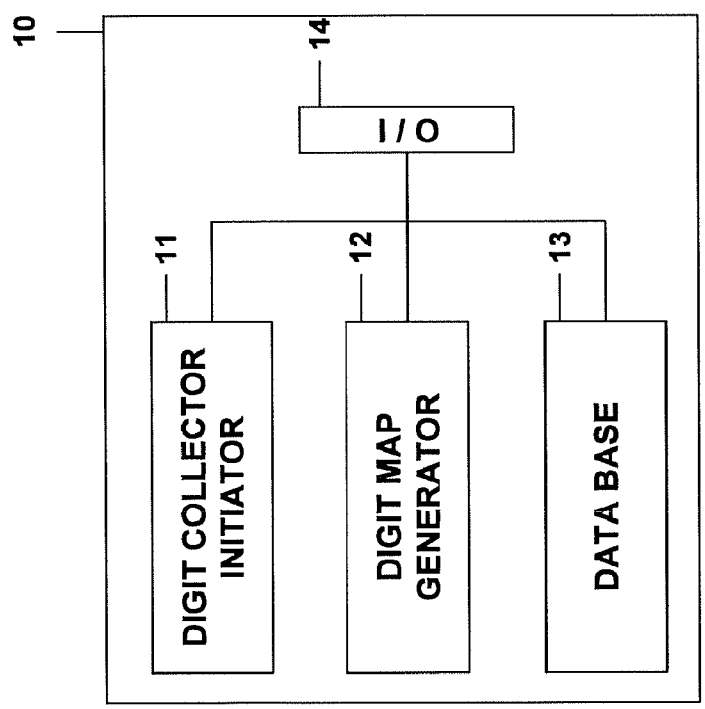

In FIG. 1 a system is shown allowing an automated or dynamic digit map generation. The system shown comprises a call control server 10 controlling calls for a predetermined number of subscribers. The call control server is a server of a fixed telecommunications network, the server 10 comprising a digit collector initiating unit 11 initiating a digit collection at an access gateway 20. The server 10 furthermore comprises a digit map generating unit 12 generating a digit map based on a first digit string received by the gateway containing a leading number of digits dialed for a call setup as will be explained in detail further below. The telephony server comprises a database 13 containing region-specific call numbers. The database 13 may be contained in the call control server itself or the database may be provided in another unit of the fixed telecommunications network to which the units shown in FIG. 1 belong. In the database the information is stored how many digits a number may have depending on the geographical region the dialed number relates to. By way of example in case a subscriber dials from Germany 0033, the database may contain the information that further nine digits will follow for a number in France to which the international prefix 0033 relates to. In another embodiment the database may contain user-specific dialed numbers, the database collecting numbers dialed by the different subscribers. As a subscriber normally dials a limited number of telephone numbers, the database allows to determine a call number length looking at the leading digits dialed by the subscriber and by comparing them to formerly dialed numbers of said subscriber. An input/output unit 14 transmits data to other components of the telecommunications network and receives data from other components. In the embodiment shown only the components needed for the understanding of the present invention are shown in the server 10 and the gateway 20 for the sake of clarity. The access gateway 20, through which a subscriber accesses the call control server, comprises an input/output unit 22 adapted to receive data, e.g. from the call control server, and adapted to transmit data to the call control server. Furthermore, a digit collecting unit 21 is provided collecting the digits dialed by a subscriber before they are sent to the call control server. The digit collector may furthermore comprise a buffer buffering the dialed digits as long as the digit map generated by the server 10 has not been received. It should be understood that the two units 10 and 20 additionally comprise other units. In the embodiment shown only an explanation of these units is given which are used for the present invention. Furthermore, it should be understood that the different units shown in the call control server may be incorporated into the server in a different architecture.

For the call control server 10 for all subscribers an initial digit map would be defined for the generation of the first digit string, which would capture the digits required for the B-number analysis on the call control server to determine the overall length of the number. By way of example the initial digit map would typically capture two or more of the leading B-number digits dialed, resulting in a first digit string of two or more digits.

Figure 2:
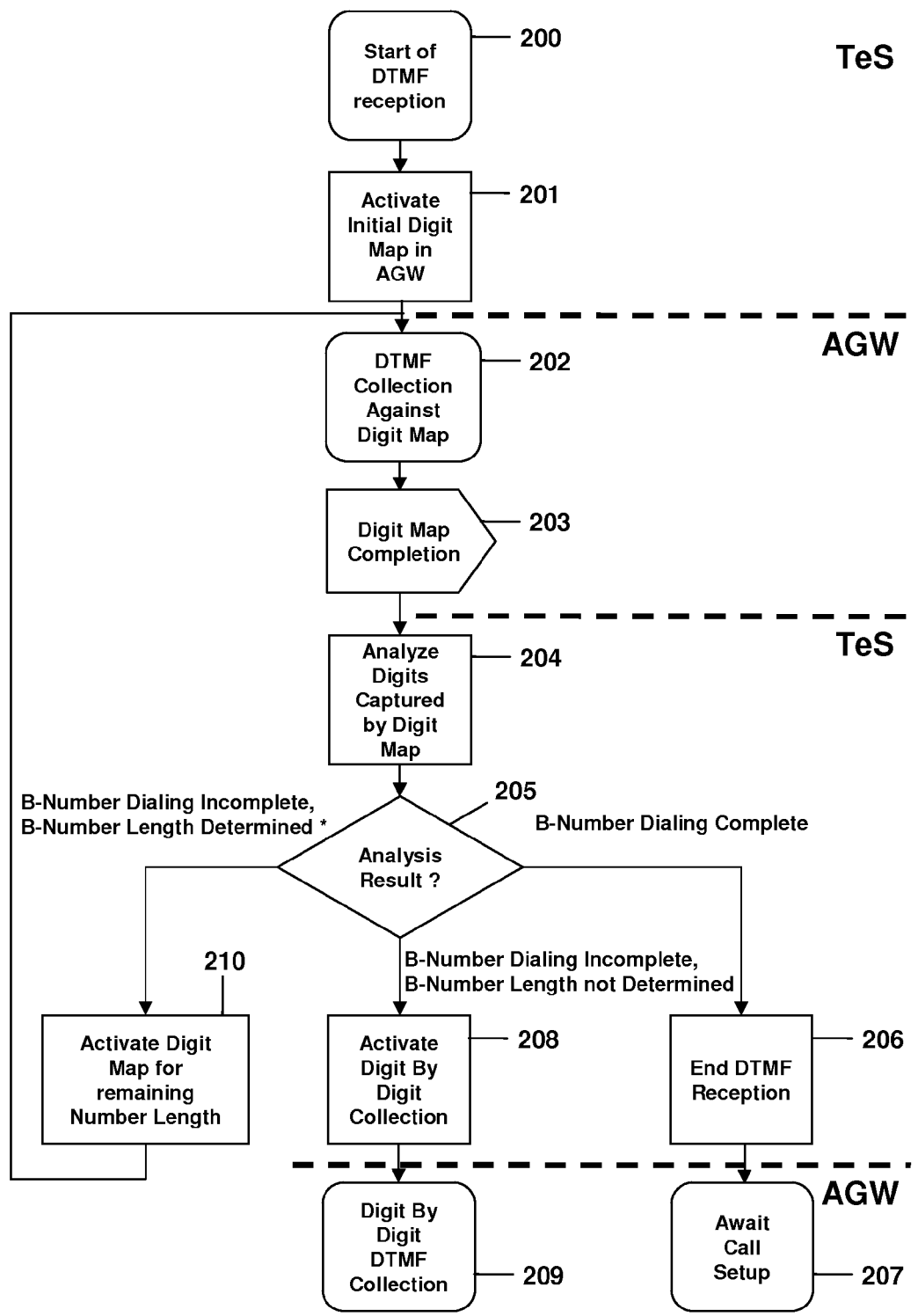
FIG. 2 shows a flowchart comprising the different steps carried out for the generation of a digit map in the system shown in FIG. 1.

In FIG. 2 a flowchart is shown explaining in more detail which steps are carried out in which of the units shown in FIG. 1. In a first step 200 the call control server or telephony server (TES) starts to receive the numbers dialed in a dual time multi-frequency (DTMF) mode. In step 201 the call control server then initiates the digit collection of the leading digits in the initial digit map for generating the first string. The access gateway (AGW) as initiated from the call control server then collects the leading digits of the number dialed in step 202. If it is determined in step 203 that the predetermined number of leading digits, such as two, three, or four digits of the number dialed, have been collected, the first digit string is then transmitted to the call control server, where the digits contained in the first digit string are analyzed in step 204. Depending on the analysis of the leading the following results may occur (step 205). If the result of the analysis carried out in step 205 is that the B-number dialing is complete with the leading digits contained in the first digit string, the DTMF reception ends in step 206. This information is transmitted to the access gateway that is awaiting the call setup in step 207.

Another result of the analysis of step 205 may be that it is determined that the B-number dialing is incomplete, but that the leading digits contained in the first digit string do not allow to determine the B-number length. In this situation, when the leading digits are compared to the information of the database 13, the total number of digits in the B-number or a minimum possible length of the B-number cannot be determined. Here, the further digits have to be collected digit by digit and transmitted to the call control server digit by digit (step 208). This information of the digit-by-digit collection is then transmitted to the access gateway, where the digit-by-digit collection is carried out in step 209.

Another result of the analysis of the leading digits contained in the first digit string may be that it is determined that additional digits will follow and that the total number length can be determined or that at least a minimum possible length can be determined. In such a case the number of remaining digits is determined in the server by subtracting the number of leading digits contained in the first digit string from the call number length as deduced from the database. The call control server then generates the call-specific digit map containing information about the remaining number length (step 210), the call-specific digit map being transmitted to the gateway, where the collection of the remaining digits is carried out. Accordingly, the call control server creates a digit map specifically to capture the remaining number of digits of the B-number based on the remaining length of the B-number. By way of example these digit maps activated in the access gateway can have the following H.248 signaling examples:

a) If the call control server determines that further eight numerical (i.e. 0 to 9) digits must be captured in the B-number, the call control server generates a digit map as follows:
DigitMap={XXXXXXXX}
b) If the call control server determines that a further five subscriber procedure digits (i.e. 0 to 9 or * or #) must be captured, the call control server generates a digit map as shown in the following H.248 example
DigitMap={[0-9EF] [0-9EF] [0-9EF] [0-9EF] [0-9EF]}

Figure 3:
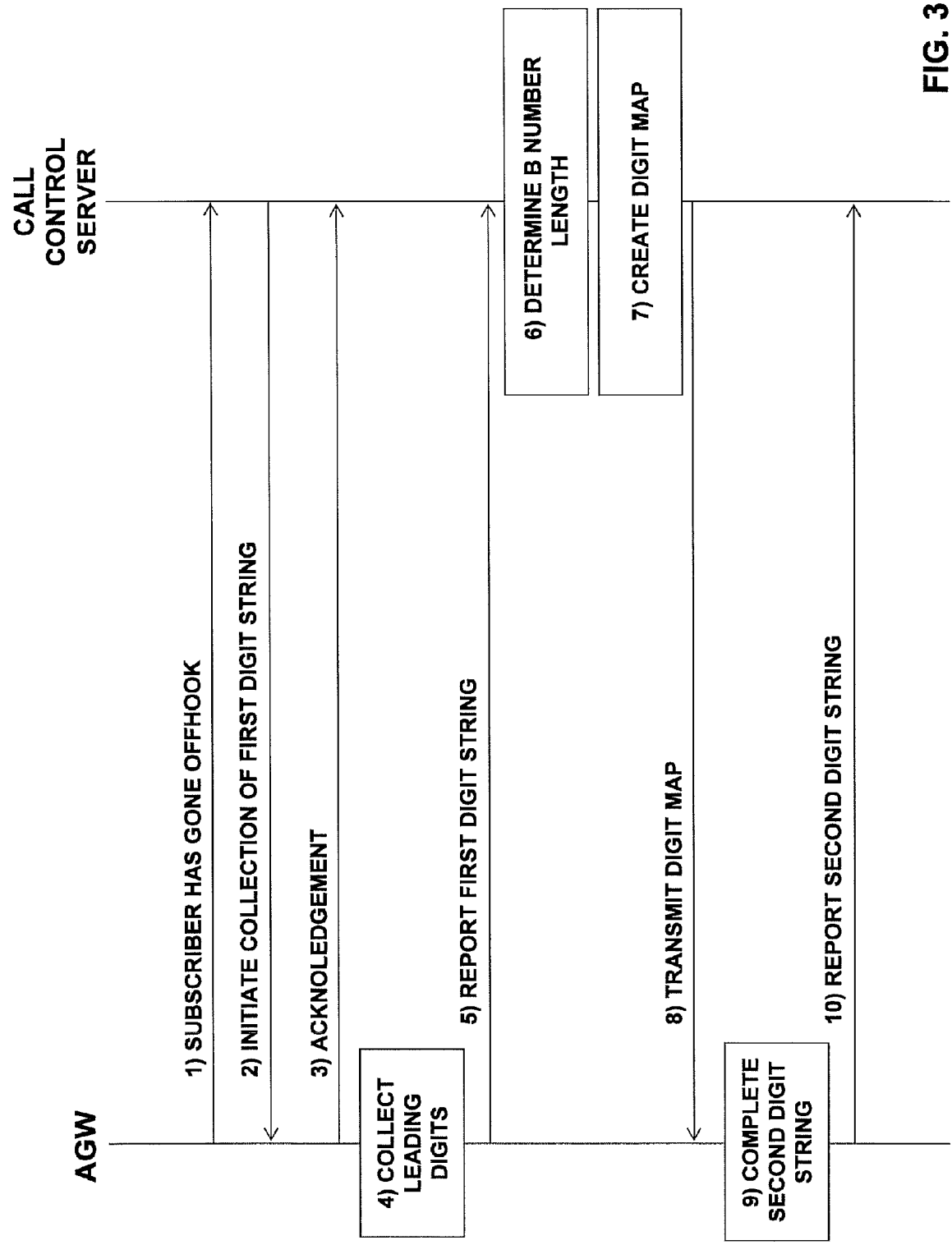
FIG. 3 shows another flowchart showing the interaction between a gateway and a call control server for a digit string collection based on a call-specific digit map.

In FIG. 3 the interaction between the call control server and the access gateway in case the number length can be determined or at least a minimum possible number length can be determined is shown. In the first step shown in FIG. 3 the access gateway informs the call control server that the subscriber has gone off hook. The call control server then in step 2 initiates the collection of the first digit string by transmitting the initial digit map, where the first two, three or four digits dialed by the subscriber are collected. The subscriber receives a dial tone and can start dialing the B-number. In step 3 the access gateway sends a positive acknowledgement to the call control server indicating that it is awaiting DTMF digits from the subscriber. In step 4 the access gateway collects the leading digits depending on the definition of the initial digit map. The access gateway then reports in step 5 the first digit string. Digits received in addition to the first digits are buffered by the access gateway until the digit map is created by the call control server and received by the gateway. In step 6 the call control server determines the B-number length by comparing the initial digits contained in the first digit string to a numbering plan contained in the call control server. The latter then creates the digit map of the remaining number length in step 7, and transmits it to the access gateway in step 8. In step 9 it is detected whether the number of digits as determined from the call number length has been received. These digits are then transmitted in a single message to the call control server in step 10. As can be seen from FIG. 3, during the time that the call control server analyzes the leading digits of the B-number and the subsequent digit map is created and activated in the access gateway it is possible that dialed digits may be received by the access gateway. It must be ensured that these digits are neither lost nor reported one by one but are instead buffered by the access gateway until they can be applied to the subsequent digit map as received in step 8.

As can be seen from the above description, the signaling load is optimized in that the call control server automatically generates a suitable digit map depending on the leading digits of the B-number dialed without an operator having to define the specific digit maps for various analysis results. The operator may only have to define the initial digit map allowing to collect the first digit string containing the predetermined number of leading digits.

The invention claimed is:

1. A method for a call control server of a fixed telecommunications network for generating a digit map for a call setup, the method comprising:
    initiating a digit collection at a gateway, in which a predetermined number of leading digits of a call number dialed for said call setup is collected in a first digit string;
    receiving said first digit string containing said predetermined number of leading digits;
    comparing the received leading digits contained in said first digit string to a numbering plan;
    generating a call specific digit map for said call based on the comparison, wherein the call specific digit map is generated during the call setup by determining a remaining B-number length of digits contained in the call number for said call setup by a B-number analysis of the leading digits; and
    transmitting said call specific digit map to the gateway.

2. The method according to claim 1, wherein initiating the digit collection comprises initiating the digit collection when a subscriber making said call has gone off hook.

3. The method according to claim 1, wherein determining the remaining number of digits comprises determining a call number length based on said predetermined number of leading digits and subtracting the predetermined number of leading digits from the call number length.

4. The method according to claim 1, wherein comparing the received leading digits comprises comparing the received leading digits to a network numbering plan containing region- or subscriber-specific call numbers.

5. The method according to claim 1, wherein generating the call specific digit map comprises generating the call specific digit map when it is determined that the dialing is incomplete after the predetermined number of leading digits and when at least a minimum possible length of the call number can be determined.

6. The method according to claim 1, further comprising initiating a digit-by-digit collection at the gateway when it is determined that the dialing is incomplete after the predetermined number of leading digits and when a call number length cannot be determined.

7. The method according to claim 1, wherein the number of leading digits comprises 2, 3, or 4 digits.

8. A call control server generating a digit map for a call setup comprising:
    a digit collecting initiating unit configured to initiate a digit collection at a gateway in which a predetermined number of leading digits of a call number dialed for said call is collected in a first digit string;
    a receiver to receive said first digit string;
    a database including a numbering plan;
    a call specific digit map generating unit configured to compare the received leading digits contained in said first digit string to the numbering plan and to generate a call specific digit map for said call based on the comparison, wherein the call specific digit map generating unit generates the call specific digit map during the call setup by determining a remaining B-number length of digits contained in the call number for said call setup by a B-number analysis of the leading digits; and
    a transmitter to transmit said call specific digit map to the gateway.

* * * * *